Patented Feb. 3, 1953

2,627,482

UNITED STATES PATENT OFFICE 2,627,482

GASKET MATERIAL AND PROCESS FOR MAKING SAME

George C. Martin and Albert J. Sears, Fort Wayne, Ind., assignors to General Electric Company, a corporation of New York No Drawing. Application June 22, 1950, Serial No. 169,788

3 Claims. (Cl. 117—126)

This invention is concerned with gasket materials and methods of preparing the same. More particularly, the invention relates to a gasket comprising a glass fiber mat coated and impregnated with a heat-cured liquid coating composition comprising (1) a dispersion of a finely divided solid material comprising a copolymer of a vinyl halide and a vinyl ester of a lower saturated aliphatic monocarboxylic acid, and (2) a liquid dispersing medium for (1) comprising (a) from 25% to 45% of a liquid polymerizable composition comprising diallyl phthalate, (b) from 15% to 45% of an unsaturated alkyd resin comprising bis cyclohexyl glyceryl maleate, and (c) a liquid plasticizer for (1) comprising the chain-stopped product of reaction of adipic acid, propylene glycol, and coconut oil fatty acids, the said plasticizer comprising the balance of the liquid dispersing medium.

In certain applications it has been desirable to obtain a gasket material which is non-wicking, has good chemical resistance, good flexibility while at the same time having the ability to withstand continuous exposures to temperatures up to as high as 125° C. In addition to the foregoing desired properties, it is also essential in certain applications that the gasket material should be able to withstand continuous exposure to both liquid and vaporized cresylic acid. Although some gaskets have been able to satisfy some of the requirements, they usually were unable to comply with the requirement that they be inert in the presence of liquid or vaporized cresylic acid which, as is well known, is a very corrosive material.

We have now discovered that unexpectedly a particular combination of materials is able to give a gasket which more than adequately satisfies all the requirements cited above and has proved very successful as a gasket material in applications where such a gasket is subjected for long periods of time to liquid and vaporized cresylic acid at elevated temperatures. More particularly, we have found that a gasket material comprising a glass fiber mat impregnated and coated with a heat-cured coating and impregnating composition comprising a finely divided suspension of a solid material comprising a copolymer of a vinyl halide, e. g., vinyl chloride, etc., and a vinyl ester of a lower saturated aliphatic monocarboxylic acid, e. g., vinyl acetate, vinyl propionate, etc., in a dispersing medium comprising a polymerizable liquid of which 25% to 45% thereof is a liquid polymerizable composition comprising diallyl phthalate, from 15% to 45% bis cyclohexyl glyceryl maleate, and the balance of the dispersing medium is essentially a plasticizer of the type described above, is eminently suitable in such applications.

Gaskets comprising the aforementioned ingredients have been used successfully in wire enameling equipment where electrical conductors are coated with insulating compositions containing cresylic acid. Such coating compositions are more particularly disclosed and claimed in Smith and Jackson patent U. S. 2,271,233, issued January 27, 1942, and in Jackson and Hall patent U. S. 2,307,588, issued January 5, 1943, both patents being assigned to the same assignee as the present invention. In both the foregoing two patents, cresylic acid is used either as a solvent for the insulating material or in some cases may appear as an excess reactant with the other materials used to make the insulating composition. In any event, the vaporous or liquid cresylic acids are quite corrosive and it has been difficult to find gaskets which will withstand the cresylic acid in applications such as that described above.

In accordance with our invention, a glass fiber mat is coated with the liquid coating composition generically described above using any of the many techniques available to persons skilled in the art for such applications. We have found it desirable to preheat the glass mat at elevated temperatures; for example, at temperatures ranging from about 150° to 250° C., more particularly, around 190° to 210° C., and thereafter dip the glass mat in the liquid coating and impregnating composition which may be maintained if desired at elevated temperatures, but which preferably is at room temperature. Thereafter, the coated and impregnated glass mat is removed from the coating composition and permitted to drain for a period of time until excess drainage has stopped. The treated glass mat is then baked under its own weight at elevated temperatures, for example, temperatures ranging from about 100° to 175° C., advantageously around 125° to 160° C., to effect conversion of the liquid composition to the infusible, insoluble, solid state. An alternative method comprises coating the glass mat with the aforementioned resinous composition and thereafter pressing it at elevated temperatures to effect curing of the coating composition.

The liquid coating and impregnating compositions employed in the practice of our invention are more particularly disclosed in the copending application of John A. Loritsch and Patrick Di Cerbo Serial No. 15,746, filed March 18, 1948, now U. S. Patent 2,567,719, issued September 11, 1951, and assigned to the same assignee as the present invention. In the latter application are disclosed many examples of finely divided solid materials comprising the copolymers of a vinyl halide and a vinyl ester of a lower saturated aliphatic monocarboxylic acid. It will therefore not be necessary in the present application to enumerate the many examples coming under the liquid coating compositions, since by reference the aforementioned Loritsch and Di Cerbo application is made a part of the present application as to its disclosures and teachings.

We have found that in addition to containing the ingredients described above, it is essential for imparting adequate flexibility to the glass mat gasket and adequate heat resistance and stability that there be employed a particular kind of plasticizer. This plasticizer comprises the chain-stopped product of reaction of adipic acid, propylene glycol, and coconut oil fatty acids. This plasticizer which appears to be critical is more specifically disclosed and claimed in Bohrer application Serial No. 96,163 filed May 28, 1949, now abandoned, and assigned to the same assignee as the present invention. Such a plasticizer may be made, for example, by effecting reaction between adipic acid, propylene glycol and coconut oil fatty acids in a molar ratio of 3.0 to 4.4 to 2.0, respectively, in the presence of heat under esterifying conditions. The reaction product obtained and isolated using this molar ratio is a liquid permanently fusible chain-stopped product having the following properties:

Specific gravity at 27° C.—1.023
Acid value—7.5
Viscosity at 27° C.—275 cps.
Molecular weight—approx. 900 to 1100

In accordance with the disclosures in the aforementioned Bohrer application, in preparing the plasticizer which is the reaction product of adipic acid, propylene glycol, and coconut oil fatty acids, the reactants are charged to a reaction vessel equipped with stirring and heating means. Thereafter, the mixture is heated at elevated temperatures, for example, from about 125° to 250° C. for a period of from about 2 to 15 hours or more while at the same time removing the water of esterification formed during the process. The heating is preferably conducted in such a manner so as to effect an incremental increase in the temperature of the reaction mass during the period of the reaction with a concurrent decrease in the acid number. It is desirable that the reaction be conducted in the presence of selected solvents which are inert to the reactants or the reaction product.

Generally the proportion of ingredients may be varied within wide limits depending on the size of the molecule desired. Thus, on a molar basis there may be used for each mol of adipic acid, at least two mols propylene glycol and two mols of the coconut oil fatty acids. In many applications, on a molar ratio basis, it has been found preferable to use from about 4 to 10 mols of the adipic acid in the reaction mixture. The amount of propylene glycol employed in such instances is generaly equal to $n+1+x$ mols thereof where $n$ is equal to the number of mols of adipic acid and $x$ is equal to at least a slight molar excess or even a large molar excess, for example, from 0.1 to 2.0 or more molar excess, e. g., to 4 to 6 mols, of the propylene glycol, necessary to cause the reaction to go to completion.

The chain-stopping coconut oil fatty acids are preferably present in a proportion of at least two mols, excess amounts remaining unreacted and requiring later removal in isolation of purification of the chain-stopped reaction products.

It will, of course, be apparent that other proportions of ingredients necessary to give the desired plasticizer may be employed in place of those disclosed above without departing from the scope of the invention. The molar ratio of ingredients will affect the properties of the plasticizer as, for example, its viscosity, molecular weight, etc.

In order that those skilled in the art may better understand how the present invention may be practiced, the following example is given by way of illustration and not by way of limitation. All parts are by weight.

*Example*

A liquid coating and impregnating composition was prepared by forming a mixture of ingredients comprising, by weight, about 273 parts diallyl phthalate, 170 parts bis cyclohexyl glyceryl maleate, 158 parts of the above-mentioned resinous plasticizer obtained by effecting reaction between adipic acid, propylene glycol and coconut oil fatty acids, 281 parts of a finely divided copolymer of vinyl chloride and vinyl acetate where the vinyl chloride preponderates, for example, where it comprises about 96% of the total weight of the starting vinyl chloride and vinyl acetate, about 2 parts tertiary butyl perbenzoate, 22 parts lead silicate, 43 parts chlorinated paraffin, 25 parts antimony oxide, and a small amount of lamp black for coloring. This mixture was ground in a pebble mill for a period of time sufficient to give a stable dispersion. This dispersion was used to thoroughly impregnate glass fiber matting by first preheating the glass mat to 200° C. and thereafter dipping the glass mat in the liquid coating and impregnating composition at room temperature. The coated and impregnated mat was removed from the liquid coating and impregnating composition, permitted to drain and thereafter baked under its own weight at 150° C. for 3 hours. At the end of this time there was obtained a flexible, strong, heat-resistant and cresylic acid-resistant gasket having a high flow point which when cut to proper size could be used in the application mentioned above for long periods of time (for instance, seven months in one test) without evidence of any attack or deterioration in the gasket. In contrast to this, when other types of gaskets (e. g., neoprene, Hycar, Thiokol, etc.) were employed, it was found that in a very short period of time the gasket deteriorated due not only to the high temperatures to which it was subjected, but also due to the corrosive liquid and vaporized cresylic acid.

It will, of course, be apparent to those skilled in the art that other types of finely divided copolymers of vinyl chloride and vinyl acetate may also be employed as will be apparent to those skilled in the art.

Additionally, the ratio of ingredients comprising the coating and impregnating composition may also be varied depending on the type of material employed, the application involved, etc. Thus, the proportion of plasticizer may be varied within certain limits without departing from the scope of the invention. For instance, the plasticizer may constitute, by weight, from about 20 to 60% of the total weight of the plasticizer and the plasticizable finely divided solid material comprising the copolymer of the vinyl halide and the vinyl esters mentioned previously.

Finally, the particular catalyst employed and the amount used may also be varied using for the purpose any one of the many peroxy type catalysts capable of effecting vinyl polymerization. Additional examples are, for example, benzoyl peroxide, tertiary butyl hydroperoxide, cyclohexyl hydroperoxide, ascaridole, etc.

Although the liquid coating and impregnating composition may be employed without further modifying agents, it may be desirable in many instances to add fillers to impart improved abrasion resistance, etc. Among such fillers may be mentioned silica, finely divided clays, calcium carbonate, etc. The amount and type of filler employed will, of course, vary depending on the particular application involved.

It will, of course, be apparent that other various modifying ingredients may also be added as, for example, other stabilizers may be added to stabilize the vinyl halide copolymers against decomposition by heat, as, for example, litharge, lead carbonate, tin tetraphenyl, tin tetraethyl, etc. The aforementioned Loritsch and Di Cerbo application discloses many other examples of various modifying agents that may be employed including detackifiers or waxes or modifying agents capable of imparting additional fire resistance and flame resistance as, for example, halogenated waxy materials, etc.

What we claim as new and desire to secure by Letters Patent of the United States is:

1. A gasket material having outstanding resistance to cresylic acid and comprising a heat-treated glass fiber mat coated and impregnated with a heat-curable composition comprising (1) a finely divided material comprising a copolymer of vinyl chloride and vinyl acetate and (2) a polymerizable liquid dispersing medium for (1) comprising, by weight, (a) from 25 to 45% liquid diallyl phthalate, (b) from 15 to 45% bis cyclohexyl glyceryl maleate, (c) the balance of the dispersing medium comprising a plasticizer for (1) consisting of the liquid chain-stopped product of reaction of adipic acid, propylene glycol, and coconut oil fatty acids, the latter chain-stopped product constituting by weight, from about 20 to 60 per cent of the total weight of the latter and the copolymer of vinyl chloride and vinyl acetate, and (d) a cure accelerator for (a) and (b).

2. A gasket material having outstanding resistance to cresylic acid and comprising a heat-treated glass fiber mat coated and impregnated with a heat-curable composition comprising (1) 488 parts of a finely divided copolymer of vinyl chloride and vinyl acetate and (2) a polymerizable liquid dispersing medium for (1) comprising, by weight, (a) 494 parts liquid diallyl phthalate, (b) 296 parts bis cyclohexyl glyceryl maleate, (c) 454 parts of a plasticizer for (1) consisting of the liquid chain-stopped product of reaction of adipic acid, propylene glycol, and coconut oil fatty acids, the aforesaid chain-stopped product constituting, by weight, from about 20 to 60 per cent of the total weight of the latter and the copolymer of vinyl chloride and vinyl acetate, and (d) a cure accelerator for (a) and (b) consisting of tertiary butyl perbenzoate.

3. The process of making a gasket material having outstanding resistance to cresylic acid, which process comprises heating a glass fiber mat at an elevated temperature and immersing the said mat in a heat-curable composition comprising (1) a finely divided copolymer of vinyl chloride and vinyl acetate, (2) a polymerizable liquid dispersing medium for (1) comprising (a) from 25 to 45%, by weight, diallyl phthalate, (b) from 15 to 45%, by weight, bis cyclohexyl glyceryl maleate, (c) the balance of the dispersing phase comprising a plasticizer for (1) consisting of the liquid chain-stopped product of reaction of adipic acid, propylene glycol, and coconut oil fatty acids, the aforesaid chain-stopped product constituting, by weight, from about 20 to 60 per cent of the total weight of the latter and the copolymer of vinyl chloride and vinyl acetate, and (d) a catalytic amount of cure accelerator for the polymerizable ingredients of (a) and (b), and heating the coated and impregnated glass mat for a time sufficient to effect conversion of the heat-curable composition to the insoluble and infusible state.

GEORGE C. MARTIN.
ALBERT J. SEARS.

REFERENCES CITED

The following references are of record in the file of this patent:

UNITED STATES PATENTS

| Number | Name | Date |
|---|---|---|
| 2,284,127 | Brunson | May 26, 1942 |
| 2,500,222 | Weaver et al. | Mar. 14, 1950 |
| 2,567,719 | Loritsch et al. | Sept. 11, 1951 |

FOREIGN PATENTS

| Number | Country | Date |
|---|---|---|
| 586,826 | Great Britain | Apr. 1, 1947 |

OTHER REFERENCES

Heukeroth Abstract of application Serial No. 774,111 (publ. in 625 O. G. 112).